United States Patent [19]

Roberts

[11] 4,386,921
[45] Jun. 7, 1983

[54] METAL POWER TRANSMISSION BELT

[75] Inventor: Richard W. Roberts, Lombard, Ill.

[73] Assignee: Borg-Warner Corporation, Chicago, Ill.

[21] Appl. No.: 344,678

[22] Filed: Feb. 1, 1982

Related U.S. Application Data

[63] Continuation of Ser. No. 144,127, Apr. 28, 1980, abandoned.

[51] Int. Cl.³ .............................................. F16G 5/00
[52] U.S. Cl. ...................................... 474/201; 474/242
[58] Field of Search ................ 474/201, 240, 242, 244, 474/245, 272

[56] References Cited

U.S. PATENT DOCUMENTS

| 962,563 | 6/1910 | Foster et al. | 474/201 |
|---|---|---|---|
| 1,185,336 | 5/1916 | Lynn | 474/242 |
| 1,343,251 | 1/1920 | Dillon | 403/278 |
| 2,038,583 | 4/1936 | Maurer | 74/236 |
| 2,475,264 | 7/1949 | Sutton | 74/236 |
| 3,089,346 | 5/1963 | Dittrich et al. | 474/242 |
| 3,720,113 | 3/1973 | Van Doorne et al. | 74/236 |
| 3,949,621 | 4/1976 | Beusink et al. | 74/231 M |

FOREIGN PATENT DOCUMENTS

| 802 | 2/1979 | European Pat. Off. | |
|---|---|---|---|
| 312405 | 5/1919 | Fed. Rep. of Germany | 474/240 |
| 414696 | 3/1942 | Fed. Rep. of Germany | 474/242 |
| 2414891 | 10/1975 | Fed. Rep. of Germany | 474/201 |
| 2414989 | 10/1975 | Fed. Rep. of Germany | 474/201 |
| 586817 | 1/1925 | France | 474/245 |
| 1066329 | 6/1954 | France | 474/201 |
| 2224021 | 10/1974 | France | 474/242 |
| 7900435 | 1/1979 | Netherlands | 474/242 |
| 256918 | 9/1948 | Switzerland | 474/201 |
| 2023700 | 1/1980 | United Kingdom | |

Primary Examiner—Lawrence J. Staab
Assistant Examiner—M. Bednarek
Attorney, Agent, or Firm—Aubrey L. Burgess

[57] ABSTRACT

A flexible power transmission belt especially adapted for transmitting power between pulleys such as variable pulleys in a transmission is constructed of a loop of material with closely adjacent lugs or teeth joined thereto, the lugs or teeth having a slot-like opening to receive the loop and having obliquely disposed wings which are deformed to join them to the loop. The wings are generally relatively soft whereas the toes or other parts of the teeth are generally hardened.

1 Claim, 3 Drawing Figures

METAL POWER TRANSMISSION BELT

This is a continuation of application Ser. No. 144,127 filed Apr. 28, 1980, abandoned.

BACKGROUND OF THE INVENTION

Composite flexible power transmission belts especially adaptable for transmitting power between pulleys, as in variable pulley transmissions, are well known in the art. One of the more recent patents, U.S. Pat. No. 3,720,113, was granted to Van Doorne et al on Mar. 13, 1973. Van Doorne et al teach a belt comprising a flexible continuous member consisting of four superimposed steel strips lying on the rounded off topside of each of a plurality of V-shaped blocks made of metal, such as steel. The superimposed steel strips are embraced by lateral portions of each V-shaped block which also have top edges preventing separation of the blocks and strip. The method by which the blocks are assembled on the steel strip is not disclosed in the Van Doorne et al patent and there is no indication that the lateral portions are deformed over the strip. The descriptive matter of the drawing and specification would indicate otherwise.

Another composite power transmission belt is illustrated and described in U.S. Pat. No. 3,949,621, granted Apr. 13, 1976 to Beusink (deceased) et al. One of the features of this belt is the construction of the metal plates corresponding to the blocks in the Van Doorne et al patent. Each of the plates is provided with slots which open at the side edges of the plates to receive tension bands; thus the belt is constructed, at least of a pair of spaced tension bands joined by trapezoidal plates.

THE INVENTION

According to the invention herein described, a power transmission belt is constructed of a continuous belt loop, with wedge-shaped friction or drive blocks connected thereto. The drive blocks are assembled in closely spaced relationship onto the loop and are so shaped to insure flexibility to the belt. The composite belt is especially adaptable for use with variable pulley transmissions with the blocks having surfaces engaging the flanges of the pulleys.

One of the primary features of this invention is the manner of making the blocks and the manner in which the blocks are attached to the belt loop. Each of the blocks is constructed of metal, the pulley engaging portion is hardened while obliquely extending wings at the ends of a slot opening which receives the loop are unhardened and deformable and are deformed to overlie the loop.

THE DRAWING

FIG. 1 is a section through a belt according to this invention;
FIG. 2 is a side view of the belt of FIG. 1; and
FIG. 3 is an illustration showing the block wings prior to deformation onto the loop member with the final disposition of the wings shown in broken lines.

DETAILED DESCRIPTION

Figure 1:
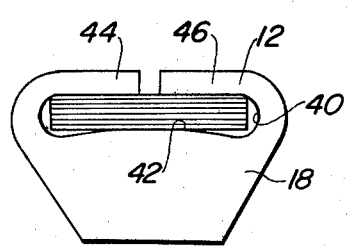
Figure 2:
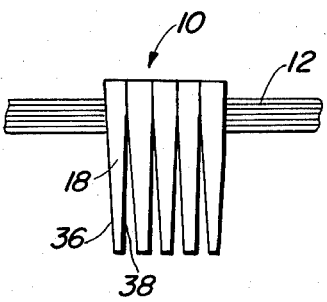
Figure 3:
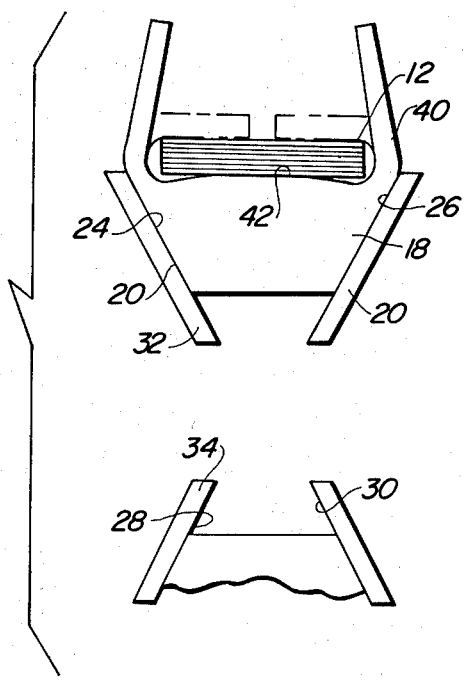

Attention is now invited to the drawings illustrating one form of a power transmission belt according to this invention. The belt 10 comprises a loop member 12 which can be made, for example, of a strip of metal 14 joined at its ends, as by welding, and a plurality of generally wedge-shaped friction blocks 18 connected to the member 12. The loop member can be constructed of other materials without departing from the spirit of the invention. The blocks 18 have angled side surfaces 20, 22 for contact with angled surfaces 24, 26 and 28, 30 of a pair of spaced pulleys 32, 34 respectively which are shown in broken lines. The pulleys 32, 34 may be of the variable variety, so as to provide stepless speed ratios therebetween. The blocks 18 are also shaped with angled surfaces 36, 38, so as to provide flexibility of the belt.

The blocks 18 are each provided with a slot-like opening 40 defined by a surface 42, and overlying wing portions 44, 46. The main body of each block 18 is preferably of hardened metal to enhance the wear characteristics of the ultimate product whereas the wing portions 44, 46 are relatively soft such that they can be bent or deformed over the member 12 to thereby join the blocks to the member.

I claim:
1. A power transmission belt especially adapted for use in a pulley transmission in which the pulleys are constructed of a pair of flanges each having an obliquely angled surface, said belt comprising the combination of at least one continuous metal loop member and a plurality of generally wedge-shaped metal drive blocks assembled in closely spaced relationship along the entire length of said loop member, said blocks each having a body portion which has been hardened and with tapered edges for frictionally engaging the flanges of said pulleys, said blocks each having wing members obliquely oriented with respect to the body portion which are deformed inwardly toward and over the loop member in order to retain the blocks on the loop member, the wing members being integral with and softer than the body portions permitting the deformation thereof over said loop member.

* * * * *